Figure 1:
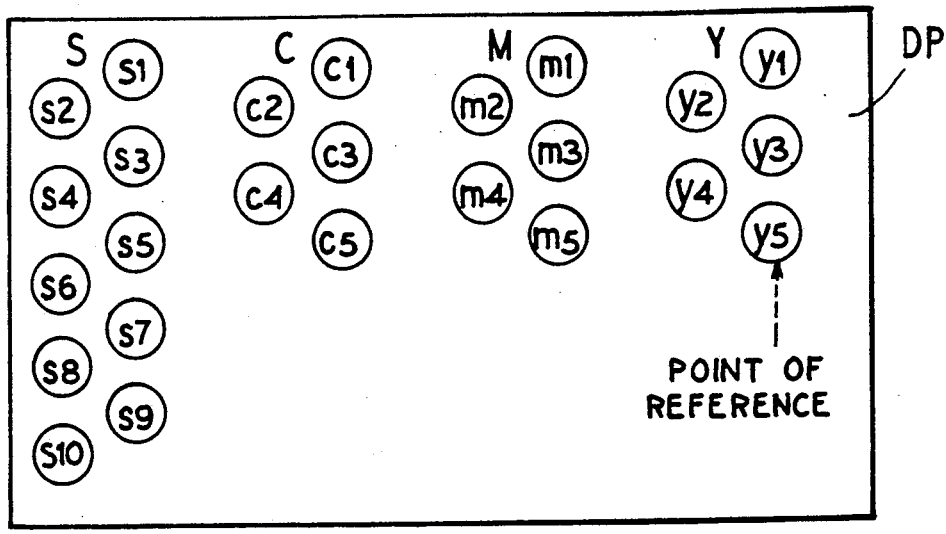

United States Patent [19]

Kristen et al.

[11] Patent Number: 5,117,371
[45] Date of Patent: May 26, 1992

[54] CHARACTER STORAGE PROCESS AND ARRANGEMENT FOR REDUCING THE REDUNDANCY OF CHARACTERS FOR MATRIX PRINTERS WITH MULTIPASS PRINTING

[76] Inventors: Franz Kristen, Münchnerstrasse 24a, D-8039 Puchheim; Martin Traute, Aidenbachstrasse 123, D-8000 München 71, both of Fed. Rep. of Germany

[21] Appl. No.: 415,361
[22] PCT Filed: Feb. 23, 1988
[86] PCT No.: PCT/DE88/00092
  § 371 Date: May 29, 1990
  § 102(e) Date: May 29, 1990
[87] PCT Pub. No.: WO88/06524
  PCT Pub. Date: Sep. 7, 1988

[30] Foreign Application Priority Data

Feb. 27, 1987 [DE] Fed. Rep. of Germany ....... 3706468

[51] Int. Cl.$^5$ ............................................. G06F 15/62
[52] U.S. Cl. .................................................. 395/150
[58] Field of Search ............... 364/518, 521, 519, 523; 340/720, 723

[56] References Cited

U.S. PATENT DOCUMENTS 4,125,829 11/1978 Kayashima ................. 340/324 AD
4,513,299 4/1985 Lee et al. ................. 346/140 R
4,554,637 11/1985 Kuntze ......................... 364/518

FOREIGN PATENT DOCUMENTS 0159402 12/1984 European Pat. Off. .

OTHER PUBLICATIONS

IBM Technical Disclosure Bulletin, vol. 25, No. 9, Feb. 1983, J. E. Bresenham et al.: "Font compression in high resolution printers", pp. 4582–4584.
Patent Abstracts of Japan, vol. 11, No. 213 (M–605) (2660), 10 Jul. 1987 & JP, A, 62030052 (Tokyo Electric Co. Ltd), 9 Feb. 1987.
IBM Technical Disclosure Bulletin, vol. 23, No. 12, May 1981, P. R. Spivey: "Data compression technique for APA printer (change block skipping)", pp. 5464–5467.

Primary Examiner—Heather R. Herndon

[57] ABSTRACT

For the runtime-optimized and code-optimized storage of characters of a given character set in the image dot memory, the various characters are investigated matrix line by matrix line according to various image dot arrangements (ZE) and only those matrix lines (SP) with different image dot arrangements (ZE) are stored. For each of these matrix lines (SP), a reference to the associated image dot information is filed in the character set and the image dot information of a matrix-matrix (sic) line (SP) is fixed by specification of an initial printing column, of a description matrix and of a run length. The lines of the character matrix (ZM) to be printed in a printing run can thus be decoded selectively without having to read out the entire image dot information of a character.

1 Claim, 4 Drawing Sheets

CHARACTER STORAGE PROCESS AND ARRANGEMENT FOR REDUCING THE REDUNDANCY OF CHARACTERS FOR MATRIX PRINTERS WITH MULTIPASS PRINTING

Character storage process and arrangement for reducing the redundancy of characters for matrix printers with multipass printing.

The invention relates to a process for the runtime-optimized and code-optimized storage of characters in matrix printers with multipass printing according to the preamble of patent claim 1.

In the case of matrix printers, which can be fitted either with a needle print head or an ink print head, in contrast with daisywheel printers, which print the characters as a whole, the letter or the character to be printed is composed of a large number of individual small dots. The print quality of these characters depends to a considerable extent on the resolution. This is determined by the number of individual dots per character, i.e. by the number of lines and columns of the character matrix. In the case of a mosaic printing process, the number of printer needles or the number of ink nozzles determines the number of lines of the character matrix within which the characters are built up.

If such a matrix printer is equipped, for example, with an ink printing mechanism, the latter includes a large number of writing nozzles, to each of which is assigned an individually actuable transducer element. The writing nozzles are in connection with an ink supply system, which is equipped with an ink bottle. This ink bottle contains either ink of black color for black printing and/or the customary printing colors in the case of three-color printing, cyan, yellow and magenta, in three separate chambers of the ink bottle. The writing nozzles end at the side facing a recording carrier of a so-called nozzle plate in outlet openings, which are arranged there in one or more rows.

For the actuation of the transducer elements, and thus for the ejection of individual ink droplets, an item of character information is taken from a character generator and transferred to an image dot memory, in which the character to be printed is, so to speak, electronically depicted. Via a printer electronics, the transducer elements are actuated in dependence on the relative movement of the head with respect to the recording carrier and according to the information in the image dot memory and the characters are built up in matrix form on the recording carrier. In this case, the build-up takes place in the character matrix, the horizontally running lines of which are also referred to as tracks, the vertically running columns of which are also referred to as print columns.

Matrix printers with added features are usually able to represent the characters with different print quality. A distinction is made here essentially between a so-called draft quality (DQ) and a near letter quality (NLQ).

In order to obtain a good print image in both print modes, the text lines are not completely applied to the recording carrier in a single printing run, but with the aid of a multipass process. In this case, the characters to be depicted are printed matrix line by matrix line in a plurality of chronologically successive printing runs.

Such a multipass printing process requires a filing or storage of the image dots in the print buffer (image dot memory), adapted to the print head's geometry, i.e. the arrangement of the needles or of the nozzle openings. This leads to a considerable memory requirement for the character set within the character generator and to relatively long processing times. These reasons give rise to the necessity of reducing the image dot storage capacity by a redundancy-reducing coding of the character information.

German patent specification No. 3,132,842 discloses a process for reducing the redundancy of binary character strings for matrix printing processes. This process is based on the fact that only a part of the altogether existing matrix dots of a character matrix is required for the representation of alphanumeric characters. Therefore, to reduce the complexity required for the dot-by-dot representation of the characters in the character matrix, details on the difference between the image dot coordinates according to amount and direction are stored in the image dot memory of the character generator for each character in the form of code words for a coordinate change in steps or in a jump. This means that a coding of the character shapes takes place by specifying columns and line distances between the individual active image dots (difference-coordinate process).

In JP-A-6 230 052, a process for reducing the storage capacity of a character generator for a matrix printer is described, in which the characters within the character matrix are investigated column by co- according to various image dot arrangements. Only those columns which have a different image dot arrangement from the adjacent columns in each case are stored.

The invention is based on the object of specifying a character storage process for matrix printers with multipass printing in which acceptable runtime conditions and memory requirement conditions can be realized in a simple way for the characters contained in the character set.

This object is achieved according to the defining features of patent claim 1.

Taking as a basis the fact that high-resolving matrix printers print the characters onto the paper in a plurality of printing runs, the parts of the character necessary for a printing run are decoded and edited. For this purpose, the characters of the given character set are investigated matrix line by matrix line according to all possible image dot arrangements and only those matrix lines of all characters of the character set which contain different image dot arrangements are stored. In the character set, a reference to the associated image dot arrangement is filed for each matrix line of a character. The lines of the character matrix to be printed in a printing run can thus be coded selectively without having to read out the entire image dot information of the character. By such a nozzle-oriented (horizontal) character storage process, a selective, and thus rapid, image dot recognition is made possible. Since the image dot information of a matrix line is not coded 1:1 bit, but is described by specification of a dot matrix and of a run length, a further advantage produced is a runtime-optimized coding of the characters. This type of matrix-oriented coding also makes possible a selective and rapid masking-out of edge dots around the contours of the characters, with the aim of avoiding color borders, which are produced by partial overlapping of foreground and background color in color printing. The horizontal image dot coding also makes possible a simple adaptation to various print head geometries, i.e. various nozzle arrangements on the nozzle plate. By the use of one and the same given character set for character printing in two print qualities, the memory requirement for the character set is further reduced.

Figure 2:
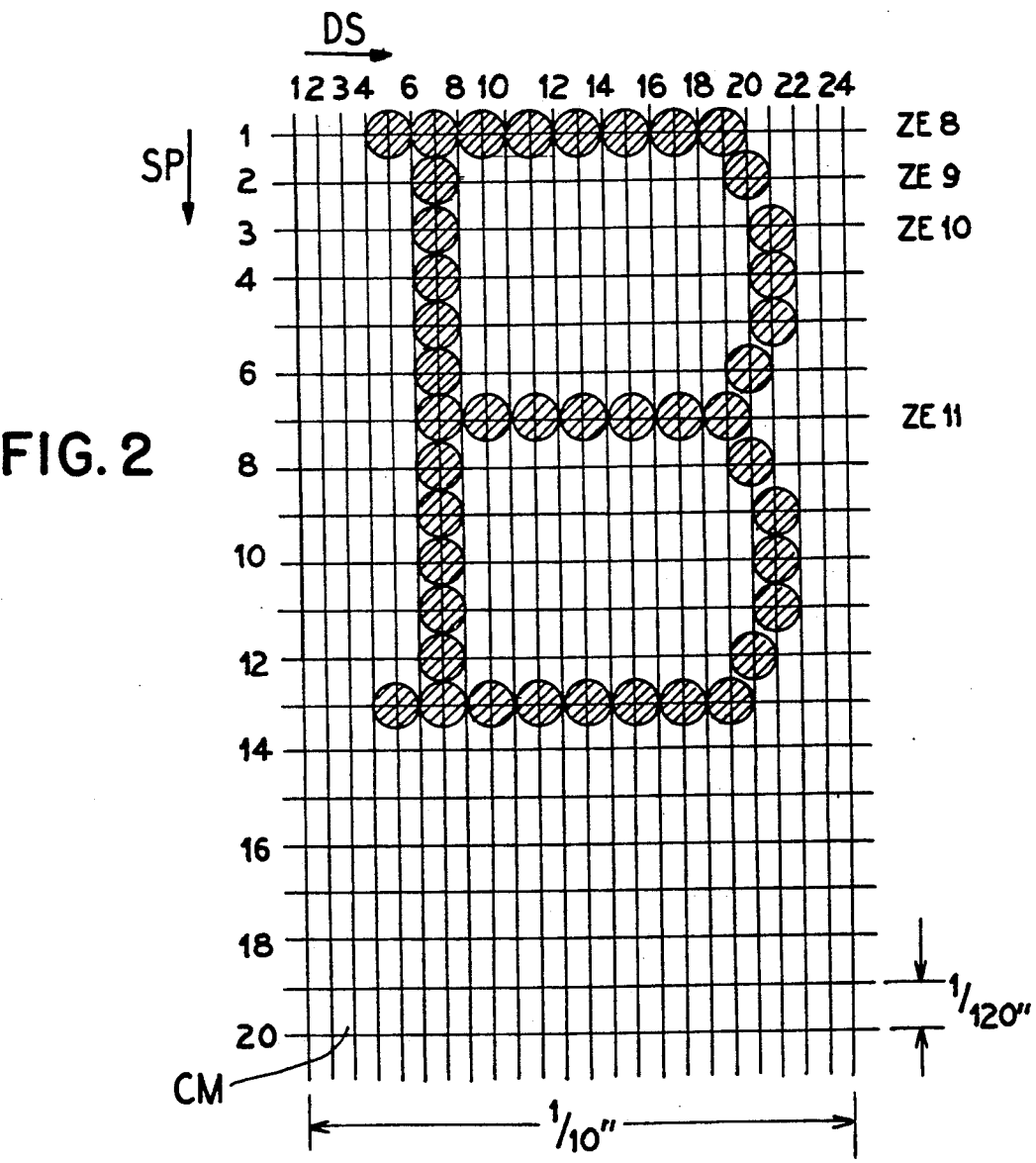
Figure 3:
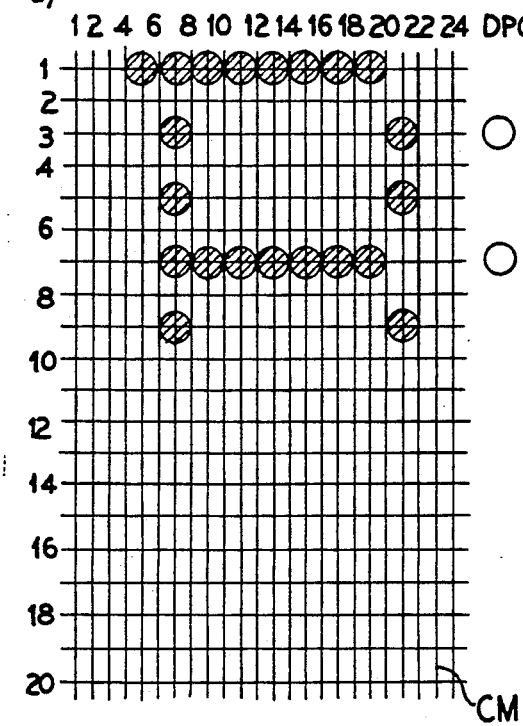
Figure 3:
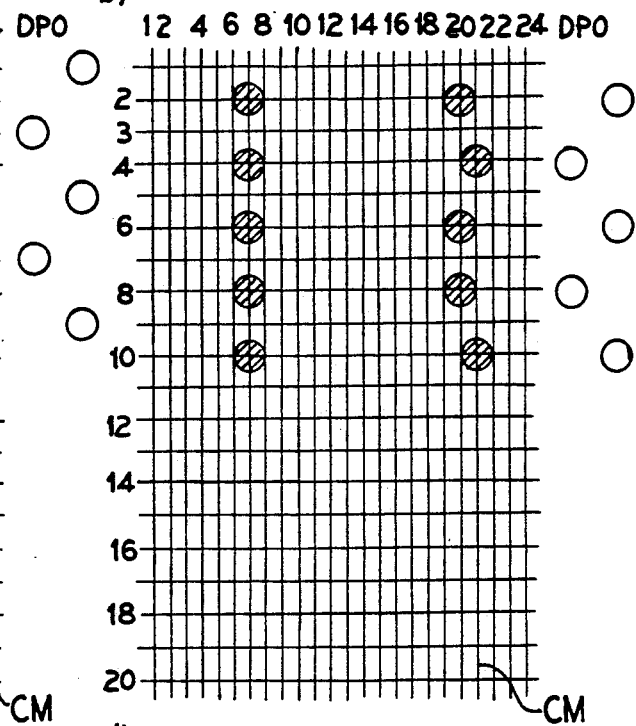
Figure 3:
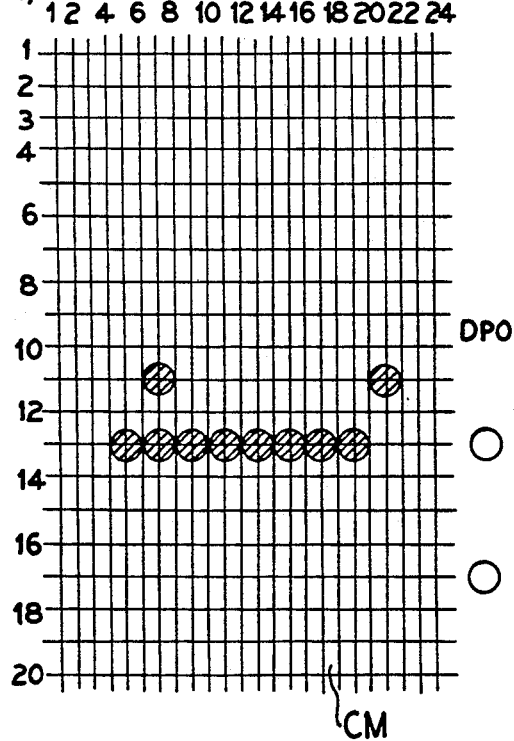
Figure 3:
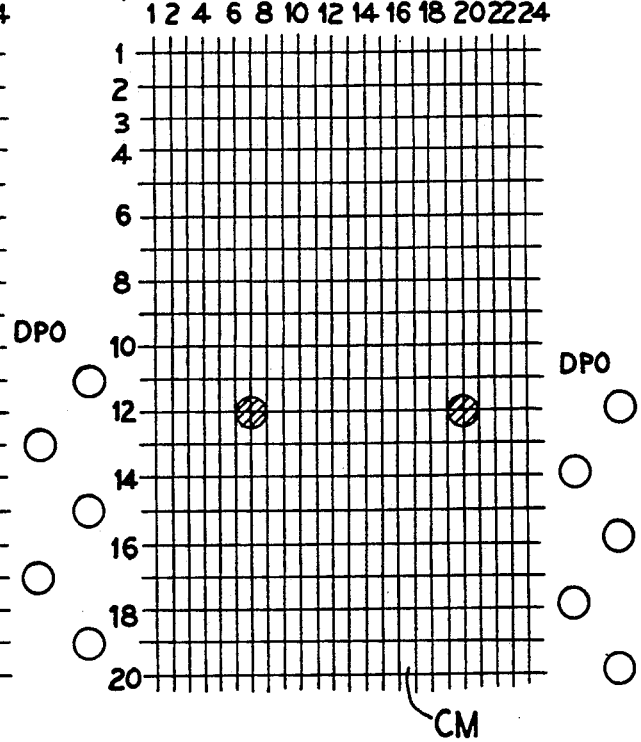
Figure 4:
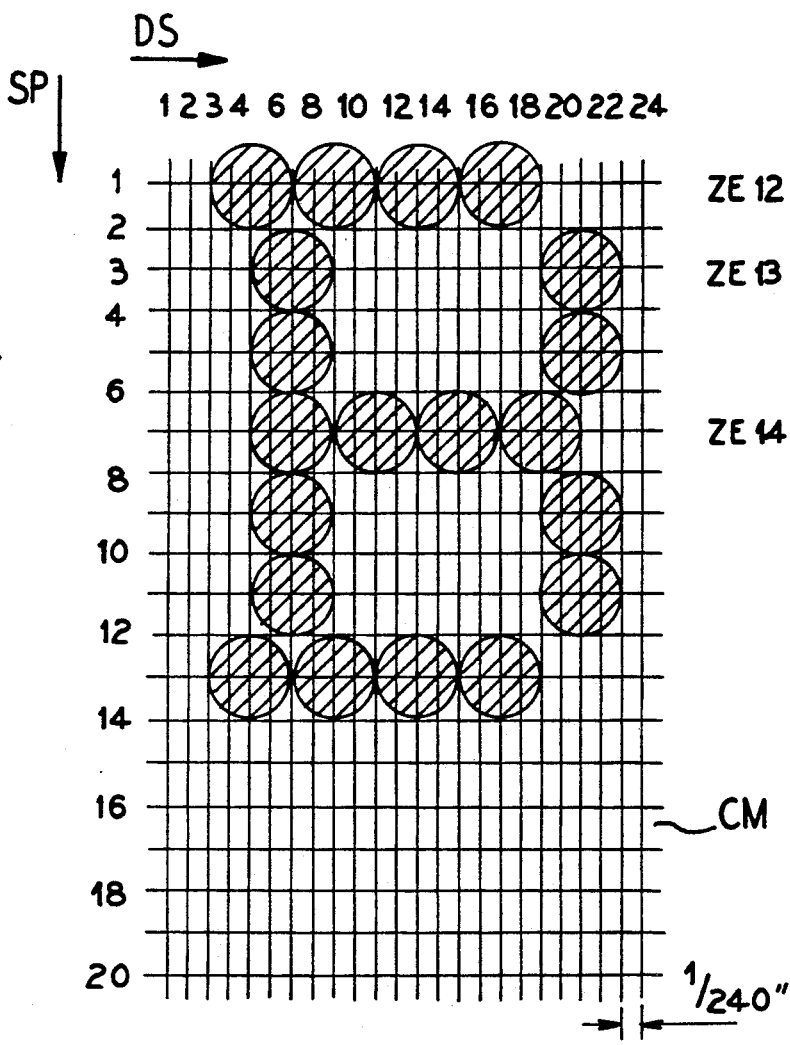
Figure 7:
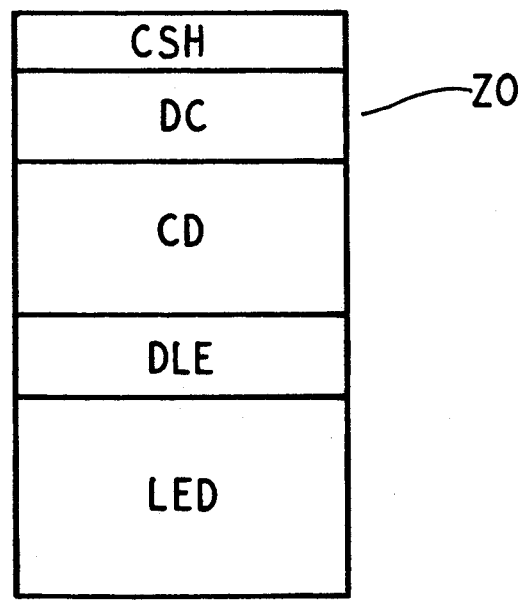
Figure 5:
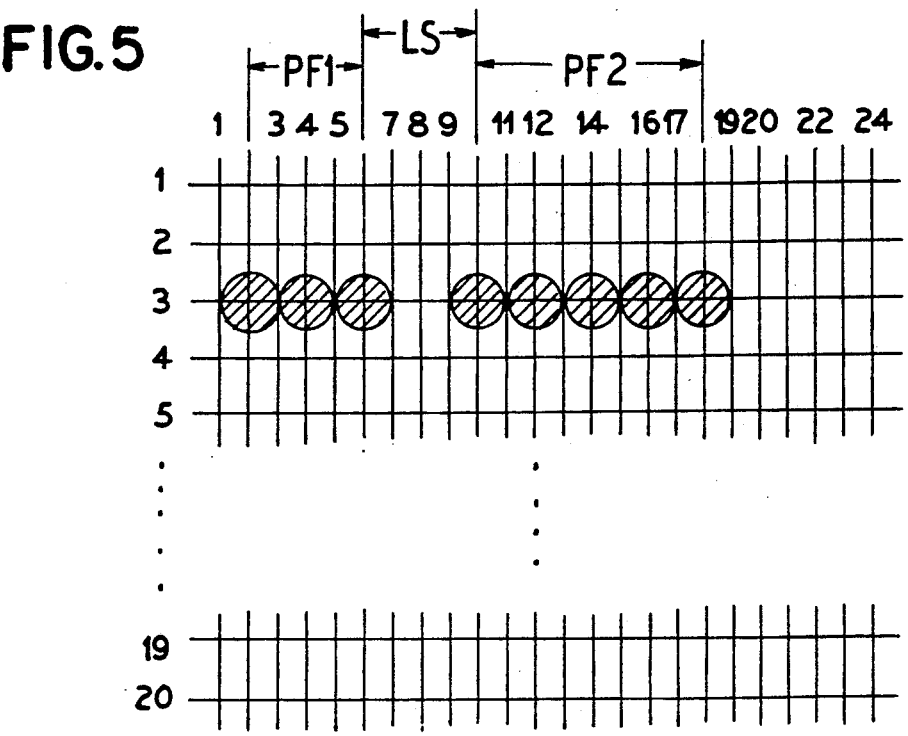
Figure 6:
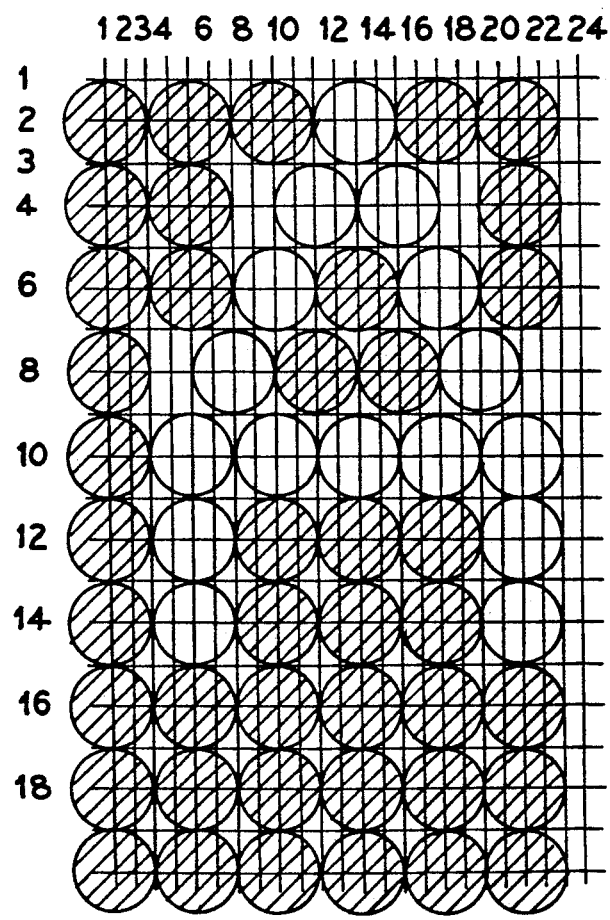

The invention is explained in more detail below with reference to the drawings, in which:

FIG. 1 shows an example of the geometric print nozzle arrangement of an ink print head for black printing and three-color printing, FIG. 2 shows a character matrix used for this nozzle arrangement with a character "B" printed in color and near letter quality, FIG. 3 shows four necessary printing runs for the creation of the character "B" according to FIG. 2, FIG. 4 shows the letter "B" according to FIG. 2 in color and in draft quality (DQ), FIG. 5 shows an example of a plurality of short image dot sequences with intermediate empty columns, FIG. 6 shows the letter "A" in reversed-out print and in draft quality, FIG. 7 shows a block circuit diagram of the character set organization with the individual character set components.

FIG. 1 shows a nozzle plate DP of an ink print head (not shown in any more detail) at which 24 nozzles s1 to y5 end. This nozzle plate DP has 8 vertically arranged and horizontally offset nozzle columns as well as 10 nozzle tracks. For black printing, a maximum of 10 nozzle tracks, corresponding to the 10 nozzles s1 to s10, can be used per print run, for color printing, a maximum of 5 nozzle tracks can be used per print run.

For such a nozzle arrangement, a character matrix CM according to FIG. 2 may consist, for example, of 24 printing columns DS and 20 tracks SP. This gives 480 matrix dots or 480 possible active image dots for the characters to be represented. In this thus chosen character matrix CM, all letters, numbers and special symbols, including ascenders and descenders, can be represented in a print quality which is close to the print quality of daisywheel printers. At a character pitch of, for example, 1/10" (=2.54 mm), the print area for one character is 2.54 mm wide. The letter "B" entered in the character matrix CM cannot be printed in a single printing run, but is the result of a print from four chronologically successive printing runs.

In FIGS. 3a to 3d, these four required printing runs for printing the desired character "B" according to FIG. 2 are illustrated. Specified on the right of the character matrix CM in each case is the nozzle position DPO associated with the corresponding printing run, the reference point of FIG. 1 being used as the basis for these positions. According to FIG. 3a, in the first printing run color dots are printed in the matrix lines (tracks SP) 1, 3, 5, 7, and 9. In the second printing run (FIG. 3b), color dots are printed in the matrix lines 2, 4, 6, 8 and 10 and in the following printing run (FIG. 3c) color dots can be applied to the matrix lines 11, 13, 15, 17 and 19. Since, however, for the representation of the letter "B", color dots are required only in the matrix lines 11 and 13, also only theses nozzles are actuated. Subsequently, in the fourth and final printing run, the matrix line 12 is printed with color dots corresponding to the character "B" to be represented (FIG. 3d).

For the printing of characters in draft quality (DQ), the DQ character shapes are derived from the character shapes for near letter quality (NLQ). In this case, the dots of the even-numbered matrix lines (tracks SP) are not printed and every other dot of the odd-numbered matrix lines is suppressed. The remaining dots of the odd-numbered matrix lines are printed with a droplet diameter which corresponds approximately to twice the diameter of the ink droplets in near letter quality (NLQ). For the generation of ink droplets of different size it is known (U.S. Pat. No. 4,513,299) to emit two or more pulses to the transducer elements at brief intervals and thereby to eject two or more droplets. These droplets combine in flight, since the following droplets have a corresponding higher flight velocity due to suitable shape of the actuating pulse (amplitude, length).

A letter "B" generated by this process in draft quality (DQ) and in color printing is represented in FIG. 4. In this print mode as well, which requires less active image dots than that for near letter quality (NLQ), the letter to be printed cannot be depicted in a single printing run. Since here, however, no image dots are printed in the even-numbered matrix lines, two printing runs suffice for the representation of the letter "B". In the first printing run, color dots are printed in the tracks SP 1, 3, 5, 7 and 9, in the following second printing run color dots are printed in the tracks 11 and 13.

Since, in the case of such a multipass printing process, the character matrix is printed line by line onto the recording carrier, it suffices to decode and process only the part of the character necessary for the respective printing run. For a character set with 256 characters, the matrix line by matrix line investigation of these characters produces 207 different image dot arrangements (line elements) in 2882 matrix lines. Only those matrix lines of the character set with different image dot arrangements are stored in the image dot memory of the printer.

In the character set, a reference to the associated image dot coding is filed for each matrix line of a character. The lines of the character matrix CM to be printed in a printing run can thus be decoded selectively, without having to read out the entire image dot information of the character.

The character matrix CM of a character of a loadable character set can be transferred line by line 1:1-bit coded from the computer system to the printer (scanner process). Each bit in this case corresponds to the information of an image dot in the character matrix CM. The bit stream is then recoded in the printer program into a printer-internal character storage format. However, some complex image dot arrangements cannot be represented by a single description matrix. In this case, the image dot sequence is subdivided into a plurality of short image dot sequences with intermediate empty columns, of which each individual one can be described by specification of a single matrix again. In FIG. 5, such an image dot arrangement is represented. In it, the first dot sequence is denoted by PF1, the empty columns by LS and the second dot sequence by PF2.

The simultaneous release of all nozzles requires a time-offset output of the color components of a character, adapted to the nozzle heads geometry (cf. FIG. 1). This is achieved by correspondingly offset filing of the image dot information in an image dot memory (for example RAM) and a correspondingly offset reading-out of the image dot memory. Due to the better memory utilization, the image dot memory is organized by printing columns, but due to the horizontal nozzle offset it is not possible to write to it printing column by printing column. In FIG. 7, a block representation of a character set organization CO on which the character storage process according to the invention is based is represented. This character set organization CO is made up of various character set components CSH to LED, it being expedient to file these individual components in contiguous memory areas. In the character set head CSH, details on type (for example cubic, pica, elite font), version and size of the character set are filed. Such a character set head CSH has the following structure:

```
                    15      - Bit -       0    words:
                   ┌─┬──────────────────────┐
                   │ │ Item code number 1   │  1
Character          │ │                      │  .
set basis          │ │                      │  .
                   │ │ Item code number 7   │  7
                   │ │ Length of the character set (bytes) │  .
                   │ │ Character pitch (n/240") │  .
                   │ │ Number of characters │  .
                   │ │ Number of line elements │
                   │ │ Offset of character description │  .
                   │ │ Offset of directory of line elements │  .
                   │ │ Offset of line element descriptions │  .
                   │ │ Length of line element descriptions (bytes) │  .
                   │ │ Reserve              │  16
                   └─┴──────────────────────┘
```

The character set head CSH comprises 16 words, each word consisting of two bytes. The first 7 words contain the item code numbers 1 to 7 and can be used for internal designations. The length of the character set in bytes indicates the extent of the memory requirement. The character pitch (word 9) is measured as the horizontal distance between two characters, from center to center, defined in inches, and determines the number of characters which are brought onto the paper per inch of the printer movement. Customary character pitches are 1/10", 1/12", 1/15" and 1/17" (2.54 mm, 2.12 mm, 1.69 mm, 1.49 mm). The number of characters is dependent on the character set used and, for example for the IBM character set used here, is 256 with 207 different image dot arrangements (line elements). The words 12, 13, 14 indicate the offset, i.e. the difference in bytes of the character description, of the directory of line elements and of the line elements description with respect to the character set basis. Word 15 indicates the length of the line element descriptions in bytes and corresponds to the memory requirement of the image dot arrangements. In addition, a reserve word (word 16) is also provided as reserve in the organization of the character set head CSH.

In the directory of the characters DC, the offset of the corresponding character description with respect to the character set basis CSB is indicated for each character code (ordinal number) occurring in the character set. That means that each character of the character code has an own ordinal number. Such a directory has the following structure:

```
                    15      Bit         0
                   ┌──────────────────────┐
  ┌─────────────┐  │                      │
  │Ordinal no. X 2│ │                      │
  │+ LSB +32    │  │                      │
  └─────────────┘  │                      │
                   │ Offset of the character │
                   │ description with respect to │
                   │ the character set basis │
                   │                      │
                   │                      │
                   └──────────────────────┘
```

The offset with respect to the character description is obtained from the ordinal number of the character (2 bytes) from the character set basis CSB plus 32 bytes (16 words of 2 bytes each in the character set head).

The organization of the character description CD for a character is made up of the character description head, the line-oriented description of the dot matrix and the description of the underscoring gap in the case of characters with descender.

The character description head comprises two bytes and has the following structure:

```
            7         - Bit -        0
           ┌─┬─┬─┬─┬─┬─┬─┬─┐
           │d│c│b│a│a│a│a│a│
           ├─┼─┼─┼─┼─┼─┼─┼─┤
           │f│f│f│f│e│e│e│e│
           └─┴─┴─┴─┴─┴─┴─┴─┘
```

Apart from the format (byte/or word format) of the character description, character parameters for character editing are filed there. The variables a to e have in this case the following meanings:

a: with use of the character set for equal-width and proportionally spaced printing, a=character width (n/240") (1"=25.4 mm), inclusive of necessary filling gaps for proportionally spaced printing a=0 in the case of exclusive use of the character set for equal-width printing (distance between two successive characters, measured from center to center of the characters, is constant)

b: descender identifier, b=0 if the character has no descender, otherwise b=1 c: feed identifier, c=0 if the character generates a horizontal feed, otherwise c=1 (characters which do not generate any horizontal feed are exceptional cases) (diacritic)

d: character description format (vertical), d=0 if the characters are indicated in byte format and d=1 if the characters are indicated in word format, consisting of two bytes, e: first matrix line number of the dot matrix and f: final matrix line number of the dot matrix -5

For storage reasons, only four bits are provided for the parameter f in the character description head comprising two bytes and thus, at most, the fifteenth line could be selected as final line. If, however, a character matrix with twenty matrix lines (printing columns DS) according to FIG. 2 is used as a basis for character printing, the number 5 must be subtracted from the final matrix number.

The line-oriented description of the dot matrix takes place by each character being described matrix line by matrix line by reference to the line element set (coded image dot information).

This is performed by indicating the line element number and a repetition factor, if any. The indication of a repetition factor is always advisable if successive matrix lines contain the same image dot information. In order to be able to distinguish in the character coding whether a line element number or a repetition factor is concerned, the following assignment applies.

| No. in character descr. | Meaning |
|---|---|
| 0 | empty matrix line |
| 1-7 | repetition factor for final line element |
| 8-MAXELEMENTNR | line elements |

Thus, a line element number, under which the image dot information of the matrix line addressed is coded in the line element description LED, is indicated for each line of the dot matrix. For those lines of the dot matrix which do not contain any image dots, the line element number 0 is to be indicated. If repetition factors greater than 7 are required for the printing of characters (example upper case "L"), the line element for the first matrix line (printing column DS) is repeated 7 times and then once again the line element for the first printing column is indicated and now a repetition factor 4 (corresponding to the size of the character, matrix lines 1 to 13, cf. FIG. 2) is indicated. The value for the maximum line element number (MAXELEMENTNR) is dependent on the number of line elements required for the character set. If it is taken into account that the numbers 1 to 7 in the character description are evaluated as repetition factors, the following applies for the MAXELEMENTNR:

MAXELEMENTNR = 255 ($=2^8-1$) if the number of line elements is less than or equal to 248

MAXELEMENTNR = 65535 ($=2^{16}-1$) if the number of line elements is greater than 248.

The data format of the character description is selected for each individual character by parameter d in the character description head and is dependent on the line element numbers used.

If line element numbers greater than 255 are used in the character description, the character description must be performed in word format. In all other cases, the character is expediently described in byte format.

| 7 | - Bit - | 0 | |
|---|---|---|---|
| 0 0 0 0 0 0 0 0 | | | Character description head |
| 1 0 0 0 0 0 0 1 | | | |
| 8 | | | Matrix line 1 |
| 9 | | | Matrix line 2 |
| 10 | | | Matrix line 3 |
| 2 | | | Matrix line 4–5 |
| 9 | | | Matrix line 6 |
| 11 | | | Matrix line 7 |
| 9 | | | Matrix line 8 |
| 10 | | | Matrix line 9 |
| 2 | | | Matrix line 10–11 |
| 9 | | | Matrix line 12 |
| 8 | | | Matrix line 13 |

In the character description head, in the first byte a=b=c=d=0, i.e. the character "B" according to FIG. 2 is printed in the character set for equal-width printing, and the character has no descender, generates a horizontal feed and is organized in byte format.

In the second byte of the character description head, f=8, i.e. the final matrix line number of the dot matrix is 13. e=1, i.e. image dots are already to be printed in the first matrix line of the dot matrix. The following 11 bytes contain the information as to which line elements 8 to 11 are to be printed in which matrix lines. Accordingly, the first matrix line is described by line element number 8, the second matrix line by line element number 9, and the third matrix line by line element number 10. The following matrix lines 4 and 5 are repetitions of the matrix line 3 and this is expressed by the repetition factor 2. The matrix line 6 is again described by the line element no. 9, the matrix line 7 by the line element no. 11. Since the matrix line 8 is identical to the matrix lines 6 and 2, the matrix line 8 is described by the line element no. 9. The matrix line 9 is identical to the matrix line 3 and is therefore described by the line element no. 10. Subsequently, again a repetition factor of 2 is entered, since the matrix lines 10 and 11 represent repetitions of the matrix line 9. The matrix line 12 is identical to the matrix lines 8, 6 and 2 and is described by the line element no. 9. The final matrix line (line 13) of the letter "B" is identical to the first matrix line and is consequently described by the line element no. 8.

If the character to be written has a descender, such as for example the lower case letters g or y, the parameter b=1 in the character description head and the line-oriented description of the dot matrix is followed by the description of the underscoring gap, comprising 2 bytes, according to the following representation:

| 7 | | | - Bit - | | | | 0 |
|---|---|---|---|---|---|---|---|
| g | g | g | g | g | g | g | g |
| h | h | h | h | h | h | h | h |

Where:

g is the column number of the character matrix from which the underscoring is omitted (n/240") and h is the number of columns not to be underscored from the position g (n/240").

In the directory of line elements DLE, the offset of the line element description, referred to the character set basis, is to be indicated according to the following structure for each line element number (for example ZE 8, 9, 10, 11 in the case of letter "B" according to FIG. 2):

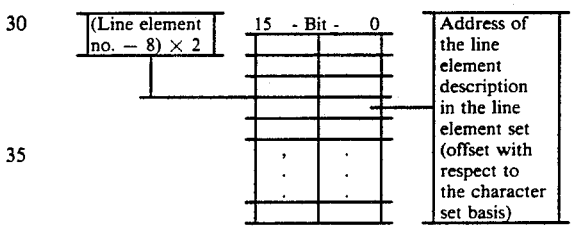

Only line element numbers greater than or equal to 8 may occur here, because the numbers 1 to 7 are evaluated as repetition factors.

In the line element descriptions, all image dot sequences (in the example of the IBM character set, comprising 256 characters, 207 different image dot sequences (=line elements)) which occur in the character images of a character set are described.

All line elements can be described by alternating chaining of regular image dot sequences (constant dot matrix) and a number of empty columns up to the following regular image dot sequence. A single dot is a special case of a regular image dot sequence.

The description of a line element always begins at a byte limit. It may have byte format or half-byte format:

| 7 | | | | - Bit - | | | 0 |
|---|---|---|---|---|---|---|---|
| a | 0 | 0 | b | b | b | b | b |
| c | c | c | c | d | d | d | d |
| f1 | | | | e1 | | | |
| f2 | | | | e2 | | | |
| f3 | | | | e3 | | | |
| . | | | | . | | | |
| . | | | | . | | | |
| ful | | | | eu−1 | | | |

Half-byte format

-continued

Byte format

| 7 | - Bit - | | | | | | 0 |
|---|---|---|---|---|---|---|---|
| a | 0 | 0 | b | b | b | b | b |
| c | c | c | c | d | d | d | d |
| e1 | | | | | | | |
| f1 | | | | | | | |
| e2 | | | | | | | |
| f2 | | | | | | | |
| . | | | | | | | |
| . | | | | | | | |
| . | | | | | | | |
| fn−1 | | | | | | | |
| en | | | | | | | |

The parameters of this line element description have the following meanings:

a: subelement format, 0=4-bit 1=8-bit
b: number of the first matrix column with dot information −1
c: entry matrix for regular dot sequences (n/240")
d: number of subelements which describe regular dot sequences (e1-en)
$e_i$: number of dots to be entered in the matrix c (regular dot sequence)
$f_i$: number of empty columns +1 between two regular dot sequences (n/240").

Accordingly, the line element description for the letter "B" according to FIG. 2 has the following structure in byte format (parameter a=1):

First element

| 1 | 0 | 0 | 0 | 0 | 1 | 0 | 0 |
|---|---|---|---|---|---|---|---|
| 2 | | | | 1 | | | |
| 8 | | | | | | | |

Second element

| 1 | 0 | 0 | 0 | 0 | 1 | 1 | 0 |
|---|---|---|---|---|---|---|---|
| 13 | | | | 1 | | | |
| 2 | | | | | | | |

Third element

| 1 | 0 | 0 | 0 | 0 | 1 | 1 | 0 |
|---|---|---|---|---|---|---|---|
| 14 | | | | 1 | | | |
| 2 | | | | | | | |

Fourth element

| 1 | 0 | 0 | 0 | 0 | 1 | 1 | 0 |
|---|---|---|---|---|---|---|---|
| 2 | | | | 1 | | | |
| 7 | | | | | | | |

The first image dot arrangement (line element 8) of the first matrix line begins in matrix column 5 (cf. FIG. 2). Since the printing column numbering in the internal computer program begins at 0 and runs up to 23 and at the beginning of the printing operation a so-called edit pointer points to the first printing column and the other printing columns are considered as a distance from this pointer (printing column 24 has the distance 23 from this pointer), the first active image dot of the line element 8 is not printed until the fifth printing column. Therefore, the parameter b represents the number of the first matrix column with dot information −1.

The entry matrix for regular dot sequences (parameter c) in the case of the first line element is 2, i.e. starting from the fifth printing column, an image dot is printed in every second printing column (7, 9, 11. . .). Because the image dots of this matrix line lie continuously in the indicated matrix, the number of subelements which regularly form image dots is equal to 1. 8 image dots in the matrix c must be entered in the first matrix line (parameter e). For the remaining matrix lines, the same as above applies analogously.

When printing characters with horizontal subpitches (half pitches), color overlaps may occur in the transitional area on uniformly scanned background.

The same problems occur in the realization of reversed-out print (white characters on black base). Here too, some dots of the background color have to be masked out when using horizontal subpitches. FIG. 6 shows the letter "A" in draft quality and reversed-out print. By use of the described character storage process with matrix-oriented coding of the image dots, the background color information can be electronically masked out in a simple way at a given horizontal distance (for example at a distance of two printing columns DS) from the character's shape, dependent on the respective character's shape and the print quality.

For a character set comprising 256 characters, for example, the character storage process according to the invention produces a memory requirement of 4.9 kbytes. That corresponds to a saving in storage capacity of about 70% in comparison with a 1:1-bit coding of the characters. This advantage has an effect in particular whenever, as usual with modern matrix printers, a plurality of character sets are available for selection and these can, furthermore, each be printed in various character pitches. If the average image dot frequency per matrix line for such a character storage process of 3 dots in the case of NLQ or of 2 dots in the case of DQ is applied, the following average character editing periods are obtained:

Black printing, 10 nozzles, 10 matrix lines:
$t_{NLQ}=635$ μs,
$T_{DQ}=649$ μs

Foreground mixed color, 5 nozzles, no background:
$t_{NLQ}=600$ μs,
$T_{DQ}=580$ μs The editing time for a character is in this case made up of the following components:
Management effort per character
Addressing of a line element
Decoding of a line element
Entry of a line element (matrix line) in the print buffer

We claim:

1. A character storage process for reducing the redundancy of characters or character sequences describing graphic patterns in an image dot memory for a matrix printer with multipass printing, which can print characters in various print qualities and the print head of which has a plurality of print elements for the printing of individual image dots, the characters being represented by these image dots in grid form in a character matrix (CM), wherein each character of a given character set is compared matrix line by matrix line with the arrangements of the image dots to be printed occurring in these individual matrix lines (SP), the individual image dots within a matrix line (SP) are combined into line elements (ZE), all line elements (ZE) of the character to be printed are compared with one another, the image dot information of a line element (ZE) is binary-coded by specification of an initial printing column, of a description matrix and of a run length, i.e. number of active image dots, the coding of the line elements (ZE) is performed either in byte format or half-byte format, depending on the number of line elements (ZE) differing from one another, the line elements (ZE) are described by alternately specifying regular image dot sequences (PF) and a number of empty columns (LS), and only those line elements (ZE) of all characters of the character set which differ from all remaining line elements (ZE) of the characters of the character set are stored in the image dot memory and a repetition factor is then stored if successive matrix lines (SP) of a character have identical line elements (ZE).

* * * * *